(12) United States Patent
Mack et al.

(10) Patent No.: US 6,749,247 B1
(45) Date of Patent: Jun. 15, 2004

(54) STOWABLE VEHICLE SEAT

(75) Inventors: Kenneth S Mack, Metamora Township, MI (US); Richard F Luzenski, Troy, MI (US); Clifford L Mortimer, White Lake, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/325,535

(22) Filed: Dec. 19, 2002

(51) Int. Cl.$^7$ .................................................. B60N 2/02
(52) U.S. Cl. ................................ 296/65.09; 296/65.01; 297/378.12; 297/341
(58) Field of Search ..................... 296/65.09, 65.05, 296/65.01, 66, 65.03, 65.13, 69, 65.16; 297/378.12, 15, 14, 336, 341, 378.1, 238

(56) References Cited

U.S. PATENT DOCUMENTS

| | | | | |
|---|---|---|---|---|
| 4,805,953 A | * | 2/1989 | Yamauchi ................. | 296/65.09 |
| 4,846,520 A | * | 7/1989 | Acuto et al. .............. | 296/65.09 |
| 4,877,282 A | * | 10/1989 | Yamauchi ................. | 296/65.09 |
| 4,957,321 A | * | 9/1990 | Martin et al. ............. | 296/65.09 |
| 5,133,589 A | * | 7/1992 | Kimura .................... | 296/65.09 |
| 5,383,699 A | * | 1/1995 | Woziekonski et al. ... | 296/65.09 |
| 5,482,349 A | * | 1/1996 | Richter et al. ............ | 296/65.09 |
| 5,570,931 A | * | 11/1996 | Kargilis et al. ........... | 296/65.09 |
| 5,904,404 A | * | 5/1999 | McCulloch et al. ... | 297/378.12 |
| 5,934,732 A | * | 8/1999 | Jakubiec ................... | 296/65.09 |
| 6,000,742 A | * | 12/1999 | Schaefer et al. .......... | 296/65.09 |
| 6,070,934 A | * | 6/2000 | Schaefer et al. .......... | 296/65.09 |
| 6,113,187 A | * | 9/2000 | Sugiyama et al. ........ | 296/65.09 |
| 6,123,380 A | * | 9/2000 | Sturt et al. ................ | 296/65.09 |
| 6,129,404 A | * | 10/2000 | Mattarella et al. ........ | 296/65.09 |
| 6,135,555 A | * | 10/2000 | Liu et al. ..................... | 297/336 |
| 6,142,552 A | * | 11/2000 | Husted et al. ............ | 296/65.09 |
| 6,152,533 A | * | 11/2000 | Smuk .......................... | 297/341 |
| 6,183,033 B1 | * | 2/2001 | Arai et al. ................ | 296/65.09 |
| 6,196,613 B1 | * | 3/2001 | Arai ......................... | 296/65.09 |
| 6,347,834 B1 | * | 2/2002 | Couasnon ................ | 296/65.09 |
| 6,416,108 B1 | * | 7/2002 | Elswick ................... | 296/96.21 |
| 6,572,171 B1 | * | 6/2003 | Pautz et al. .............. | 296/65.09 |
| 6,578,919 B2 | * | 6/2003 | Seibold et al. ........... | 296/65.09 |
| 6,588,823 B1 | * | 7/2003 | Carlsson et al. ......... | 296/65.01 |
| 2001/0001526 A1 | * | 5/2001 | Moon et al. ............. | 296/65.09 |

FOREIGN PATENT DOCUMENTS

| | | | |
|---|---|---|---|
| FR | 2 605564 | * | 4/1988 |
| JP | 58 67528 | * | 4/1983 |

\* cited by examiner

Primary Examiner—Kiran Patel
(74) Attorney, Agent, or Firm—Donald J. Wallace

(57) ABSTRACT

A stowable vehicle seat assembly and a method of manufacturing a stowable vehicle seat. More specially, the stowable seat includes a bottom assembly forming the lower portion of a vehicle seat, and a rear assembly forming the back portion of the vehicle seat. In the stowed configuration, the bottom assembly and rear assembly are uncoupled, each folding to form a substantially flat subassembly easily stowed and fixed against a vehicle floor adjacent one another.

1 Claim, 9 Drawing Sheets

STOWABLE VEHICLE SEAT

BACKGROUND OF THE INVENTION

1. Field of the Invention

The invention relates to a stowable vehicle seat and a method of manufacturing a stowable vehicle seat. More specifically, the stowable seat includes a bottom assembly forming the lower portion of a vehicle seat, and a rear assembly forming the back portion of the vehicle seat suitable for stowing in a depression of a vehicle floor.

2. Description of Related Art

Vehicles are manufactured in a variety of body configurations including economy cars, mid-size cars, sport coupes, vans, all terrain vehicles, pick-ups to name a few. Regardless of body configuration the vehicle operator may desire additional interior cargo room. A number of approaches have been taken to provide this additional cargo room by providing flexible seat designs. Seats can be detached from the vehicle to create additional cargo space, seats can be move forward to create additional cargo space, or folded. Generally however, seat designs remain bulky. Seats are not easily removed from the vehicle. Seats that move forward within the vehicle still occupy precious interior space. Seats that fold remain bulky and only free upper space within the vehicle. In addition, space is typically not available to receive a folded seat in a vehicle floor due to limited package space due to driveline position and suspension travel.

SUMMARY OF THE INVENTION

The stowable seat assembly of the present invention includes a bottom assembly and a rear assembly. In the assemble configuration, the bottom assembly forms the lower portion of a seat and the rear assembly forms the back of a seat. In the stowed configuration, the bottom assembly and rear assembly are uncoupled, each folding to form a substantially flat subassembly easily stowed and fixed against a vehicle floor adjacent one another.

The bottom assembly includes a front support and a bottom frame which together act as a stowable subassembly. The front support is suitable for attaching to a vehicle floor in order to pivot between a substantially upright support position and a substantially horizontal stowed position. The bottom frame is attached to the front support and can in turn pivot between a seat position and a ready-to-stow position. When the front support is in the support position, the bottom frame can be allowed to pivot from the substantially horizontal seat position to the substantially upright ready-to-stow position where it aligns with the front support and "locks" into place relative to the front support. In this intermediate configuration, the front support and the bottom frame form a substantially upright flat ready-to stow subassembly. In response to the bottom frame being placed in the ready-to-stow position, the front support is allowed to pivot to the stowed position. Once in the stowed position, the front support and bottom frame form a substantially horizontal flat configuration. The bottom assembly can thus be easily stowed and fixed against the vehicle floor or within a depression in a vehicle floor in order to prevent movement relative to the vehicle floor.

The rear assembly includes a rear support and a rear frame which together act as a stowable subassembly. The rear support is suitable for being attached to a vehicle floor in order to pivot between a substantially upright support position and a substantially horizontal stowed position. The rear frame is pivotally attached to the rear support. The rear frame can in turn pivot between a seat-back position and a ready-to-stow position where it aligns with the rear support and "locks" into place relative to the rear support. In this intermediate configuration, the rear support and the rear frame form a substantially upright flat ready-to-stow configuration. In response to the rear frame being pivoted from the seat-back position to the ready-to-stow position, the rear support is allowed to pivot to the stowed position. Once in the stowed position, the rear support and rear frame form a substantially horizontal flat configuration. The rear assembly can thus be easily stowed and fixed against the vehicle floor or within a depression in a vehicle floor in order to prevent movement relative to the vehicle floor.

According to one embodiment of the rear assembly, the rear frame additionally includes a telescoping assembly capable of telescoping between an extended position and a retracted position. This allows the rear frame to be reduced in size prior to placing the rear frame in the ready-to-stow position.

The detailed description, while indicating preferred embodiments of the invention and specific examples, is intended for purposes of illustration only. Variations and modifications within the scope and spirit of the invention will become apparent to those skilled in the art from the following detailed description.

BRIEF DESCRIPTION OF THE DRAWINGS

The present invention will become more fully understood from the detailed description and the accompanying drawings.

DETAILED DESCRIPTION OF EXEMPLARY EMBODIMENTS

Figure 1:
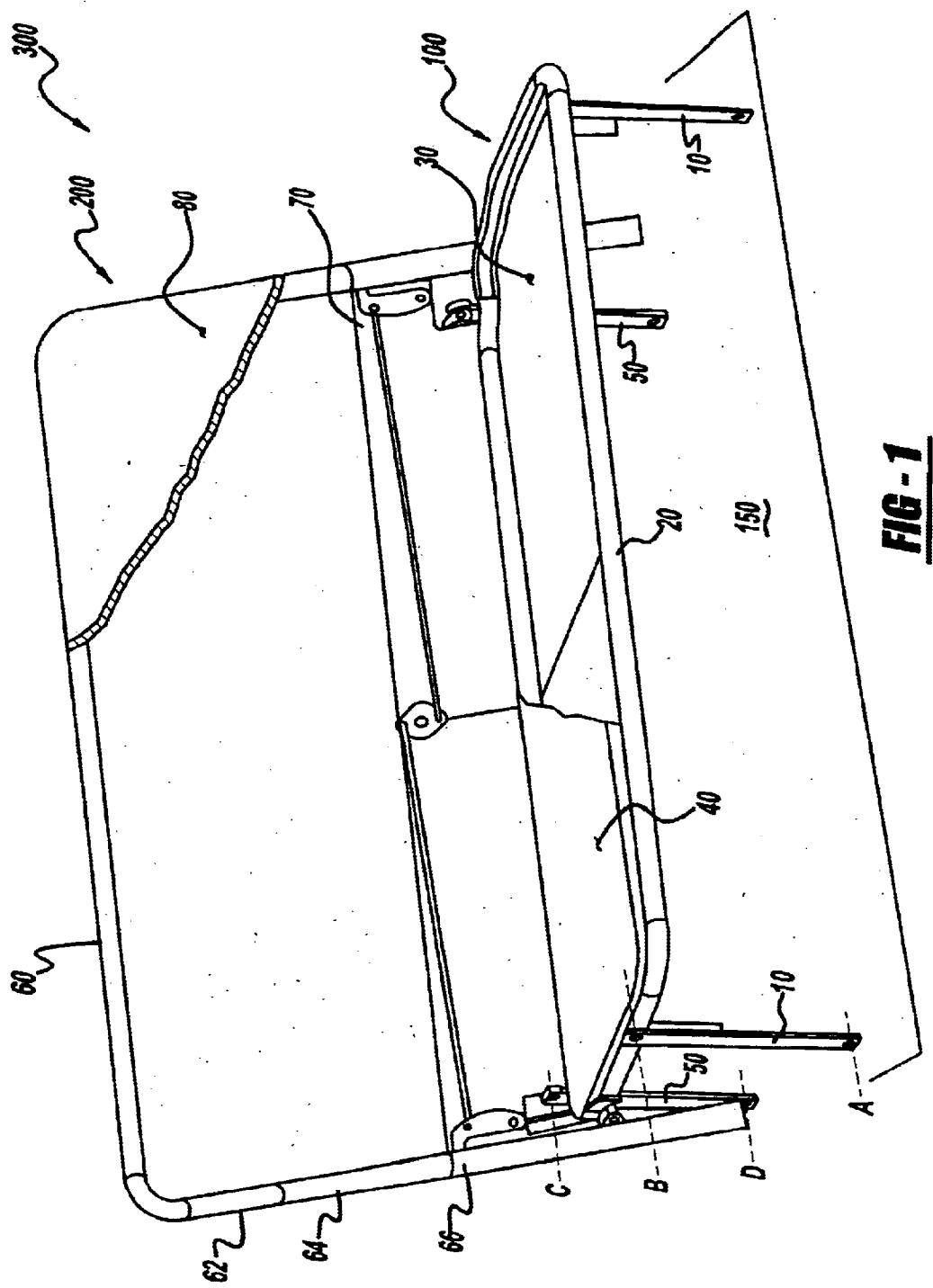
FIG. 1 illustrates an embodiment of a stowable vehicle seat in the assembled position.

FIG. 1 illustrates an embodiment of a stowable vehicle seat 300 in the assembled configuration. The stowable vehicle seat 300 of the present invention includes a bottom assembly 100 and a rear assembly 200 each acting as a stowable subassembly. In the assembled configuration, the bottom assembly 100 forms the lower portion of a seat, and the rear assembly 200 forms the back portion of the seat. In the stowed configuration, the bottom assembly 100 and rear assembly 200 are uncoupled, each folding to form a substantially flat subassembly easily stowed and fixed adjacent one another against a vehicle floor 150 or within a cavity or depression in the vehicle floor 150.

The bottom assembly 100 includes a front support 10 and a bottom frame 20. The bottom frame 20 is pivotally attached to the front support 10 and can pivot about point B between a seat position and a ready-to-stow position. The front support 10 is suitable for pivotally attaching to vehicle floor 150 in order to pivot about point A between a substantially upright support position and a substantially horizontal stowed position.

The rear assembly 200 includes a rear support 50 and a rear frame 60. The rear frame 60 is pivotally attached to the rear support 50 and can pivot about point C between a seat-back position and a ready-to-stow position. The rear support 50 is suitable for being attached to a vehicle floor 150 in order to pivot about point D between a substantially forward angled support position and a substantially horizontal stowed position.

The bottom assembly 100 and the rear assembly 200 are formed to have a low profile. The bottom frame 20 is tubular in shape. A bottom cross piece 30 forms a flat plane rigidly coupled to the bottom frame 20. The bottom crosspiece 30 is load bearing and is suitable for supporting a bottom cushion 40 and a vehicle passenger. The rear frame 60 is also tubular in shape. A rear cross piece 70 forms a flat plane and is rigidly coupled to the rear frame 60. The rear crosspiece 70 is load bearing and is suitable for supporting a rear cushion and a vehicle passenger. The rear support 50 is pivotally connected to the rear frame 60 via the rear cross piece 70 at point C. When in the stowed position, the bottom cross piece 30 and the rear cross piece 70 are also suitable to serve as a load bearing floor for receiving cargo loaded into the vehicle. The efficiency of the bottom frame 20 and bottom cross piece 30 and of the rear frame 60 and rear cross piece 70 result in a low profile lightweight vehicle seat design suitable for use as a load-bearing floor when in the stowed position.

According to one embodiment, a bottom cushion 40 is coupled to the bottom frame 20. The bottom cushion 40 may be detached from the bottom frame 20 before the bottom assembly 100 is stowed. In an alternative embodiment, the bottom cushion 40 may be sufficiently thin that it can be permanently attached to the bottom frame 20 and stowed with the bottom assembly 100.

According to one embodiment, a back cushion 80 is coupled to the rear frame 60. The back cushion 80 may also be detached from the bottom frame 20 before the rear assembly 200 is stowed. In an alternative embodiment, the back cushion 80 may be sufficiently thin that it can be permanently attached to the rear frame 60 and stowed with the rear assembly 200.

Figure 2:
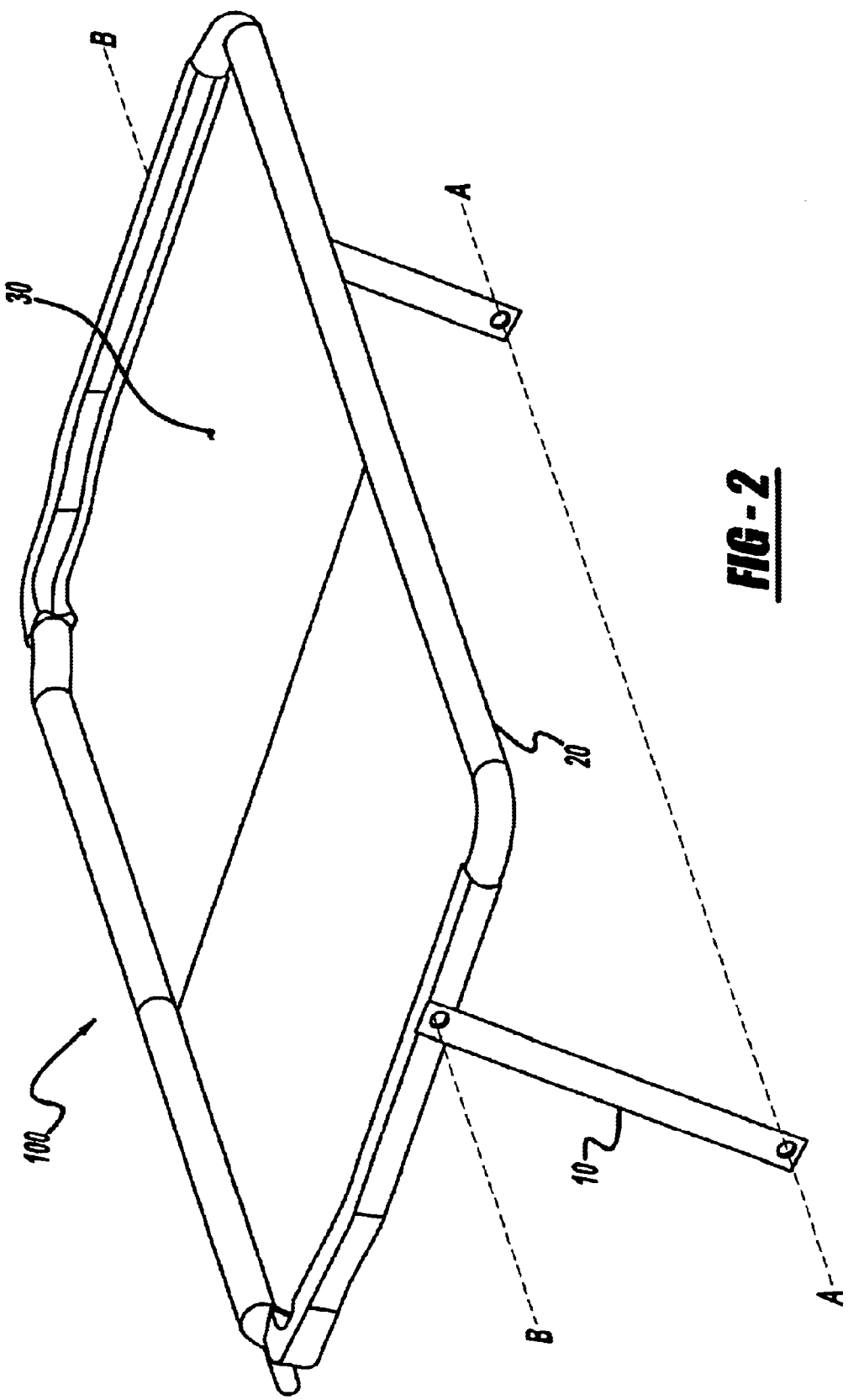
FIG. 2 illustrates an embodiment of a bottom assembly of the stowable vehicle seat in the seat position.

FIG. 2 illustrates an embodiment of a bottom assembly 100 of the stowable vehicle seat 300 in the seat position. In this configuration, the front support 10 is in the support position and is substantially upright, and the bottom frame 20 is in the seat position and is substantially horizontal.

Figure 3:
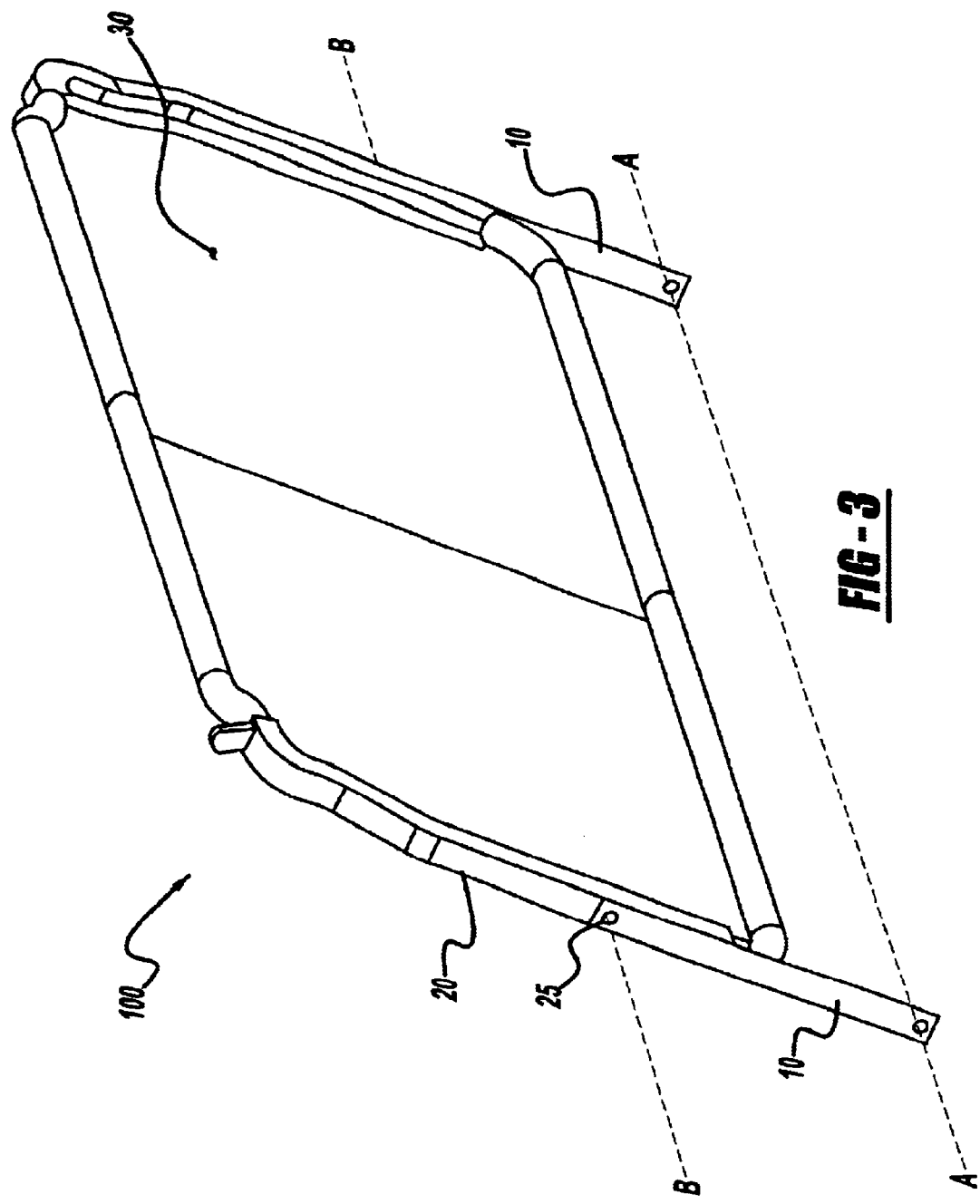
FIG. 3 illustrates an embodiment of a bottom assembly of the stowable vehicle seat in the ready-to-stow position.

FIG. 3 illustrates an embodiment of a bottom assembly 100 of the stowable vehicle seat 300 in the ready-to-stow position.

A bottom frame pivoting means 25 couples the bottom frame 20 and the front support 10 at point B. The bottom frame pivoting means 25 may be comprised of a mechanism having a latched position for locking the bottom frame 20 relative to the front support 10 when it is in one of the seat position, shown in FIG. 2, and the ready-to-stow position, shown in FIG. 3, and a pivot position for allowing the bottom frame 20 to pivot between the seat position and the ready-to-stow position.

While the front support 10 is in the support position, the bottom frame 20 can be allowed to pivot from the substantially horizontal seat position to the substantially upright ready-to-stow position where it aligns with the front support 10 and "locks" into place relative to the front support 10. In this intermediate configuration, the front support 10 and the bottom frame 20 form a substantially upright flat ready-to-stow subassembly.

Figure 4:
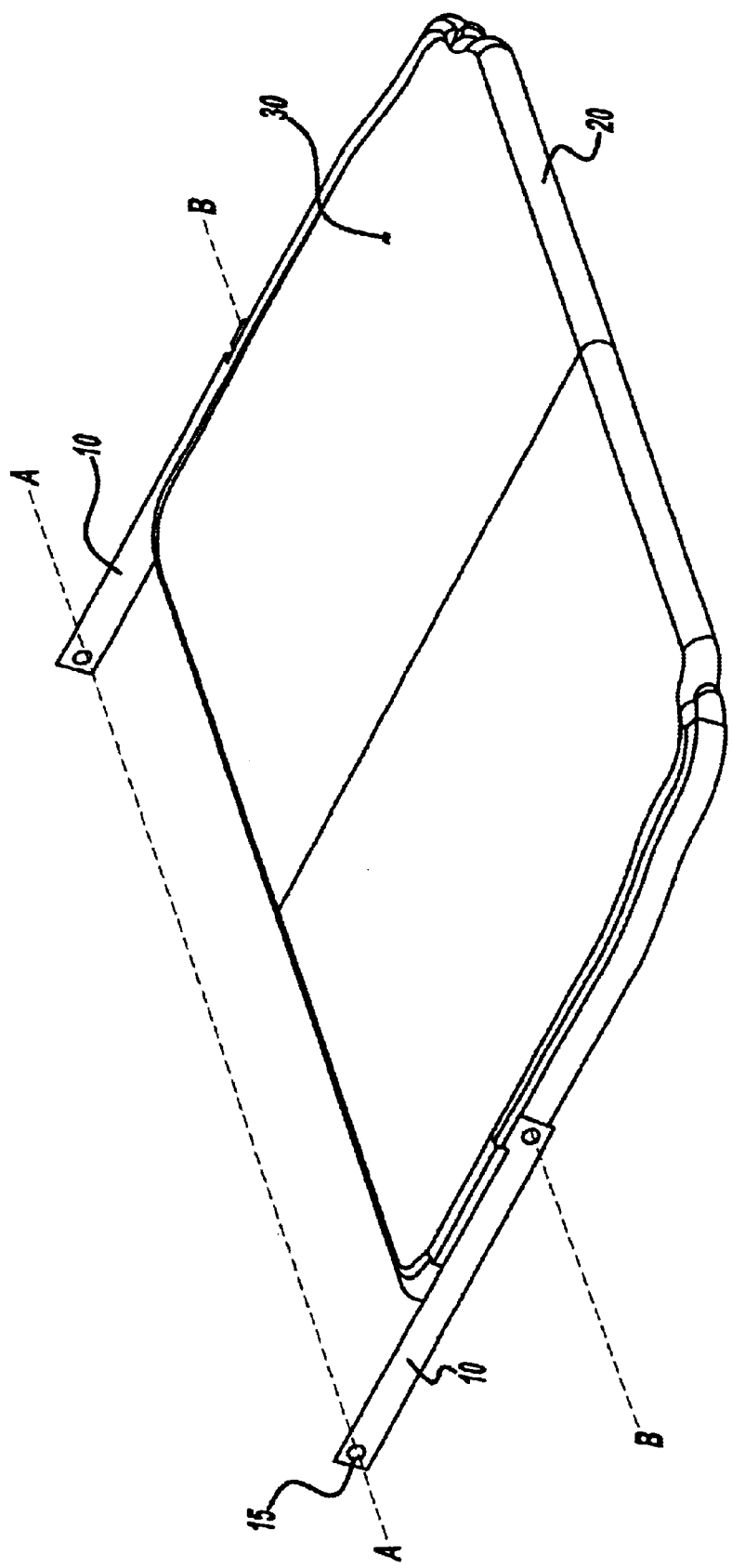
FIG. 4 illustrates an embodiment of a bottom assembly of the stowable vehicle seat in the stowed position.

FIG. 4 illustrates an embodiment of a bottom assembly 100 of the stowable vehicle seat 300 in the stowed position.

A front support pivoting means 15 is coupled to the front support 10 at point A for pivotally coupling the front support 10 to the vehicle floor 150. The front support pivoting means 15 may be comprised of a mechanism having a latched position for locking the front support 10 relative to the vehicle floor 150 when the front support 10 is in one of the support position and the stowed position, and a pivot position for allowing the front support 10 to pivot between the support position and a stowed position.

In addition, the front support pivoting means 15 may include a means for sensing when the bottom frame 20 is pivoted from the seat position to the ready-to-stow position and for placing the front support pivoting means 15 in the pivot position in response. The means for sensing when the bottom frame 20 is pivoted from the seat position to the ready-to-stow position may be a mechanical linkage or may be an electric contact.

In response to the bottom frame 20 being placed in the ready-to-stow position, shown in FIG. 3, the front support 10 is allowed to pivot to the stowed position, shown in FIG. 4. Once in the stowed position, the front support 10 and bottom frame 20 form a substantially horizontal flat configuration. The bottom assembly 100 can thus be easily stowed and fixed against the vehicle floor 150 or within a depression 160 in a vehicle floor 150 in order to prevent movement relative to the vehicle floor 150.

Figure 5:
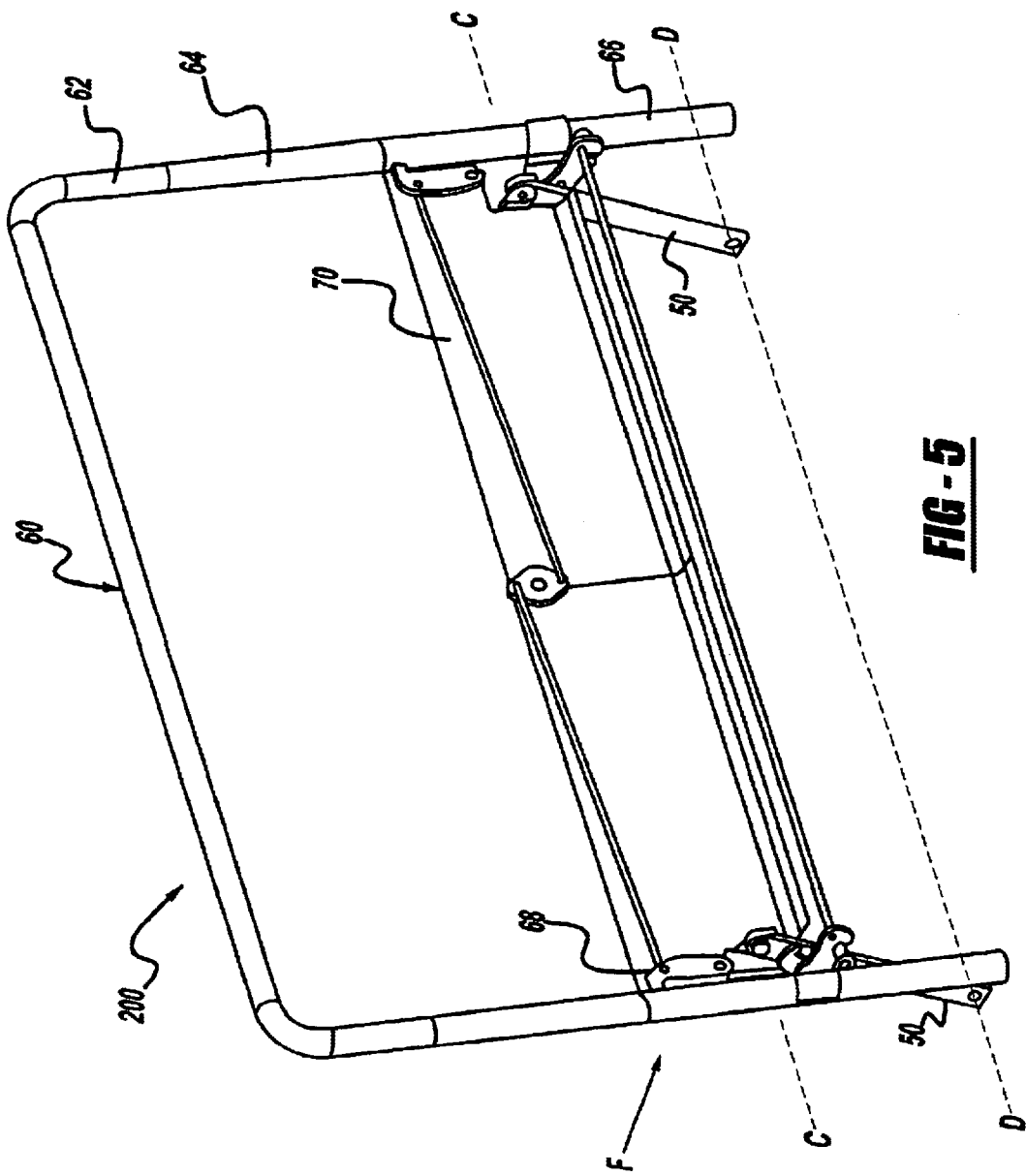
FIG. 5 illustrates an embodiment of a rear assembly of the stowable vehicle seat in the seat-back position.

FIG. 5 illustrates an embodiment of a rear assembly 200 of the stowable vehicle seat 300 in the seat-back position. In this configuration, the rear support 50 is angled toward the front F of the vehicle, and the rear frame 60 is substantially upright.

According to one embodiment of the rear assembly 200, the rear frame 60 comprises a telescoping assembly capable of telescoping between an extended position and a retracted position. This allows the rear frame 60 to be reduced in size prior to placing the rear frame 60 in the ready-to-stow position.

The telescoping assembly includes upper frame 62 capable of telescoping within mid-frame 64 which in turn telescopes within lower frame 66. In this embodiment, lower frame 66 extends to the vehicle floor providing sufficient length to receive mid-frame 64 and upper frame 62 when the telescoping assembly is placed in the retracted position. In this embodiment, the height of the rear crosspiece 70 extends only to the height of the lower frame 66. This prevents the rear cross piece 70 from interfering with the upper frame 62 and mid-frame 64 when telescoped within the lower frame 66. In the retracted position, the rear cross piece 70, lower frame 66 and the upper portion of the upper frame 62 form a substantially continuous unit.

Figure 6:
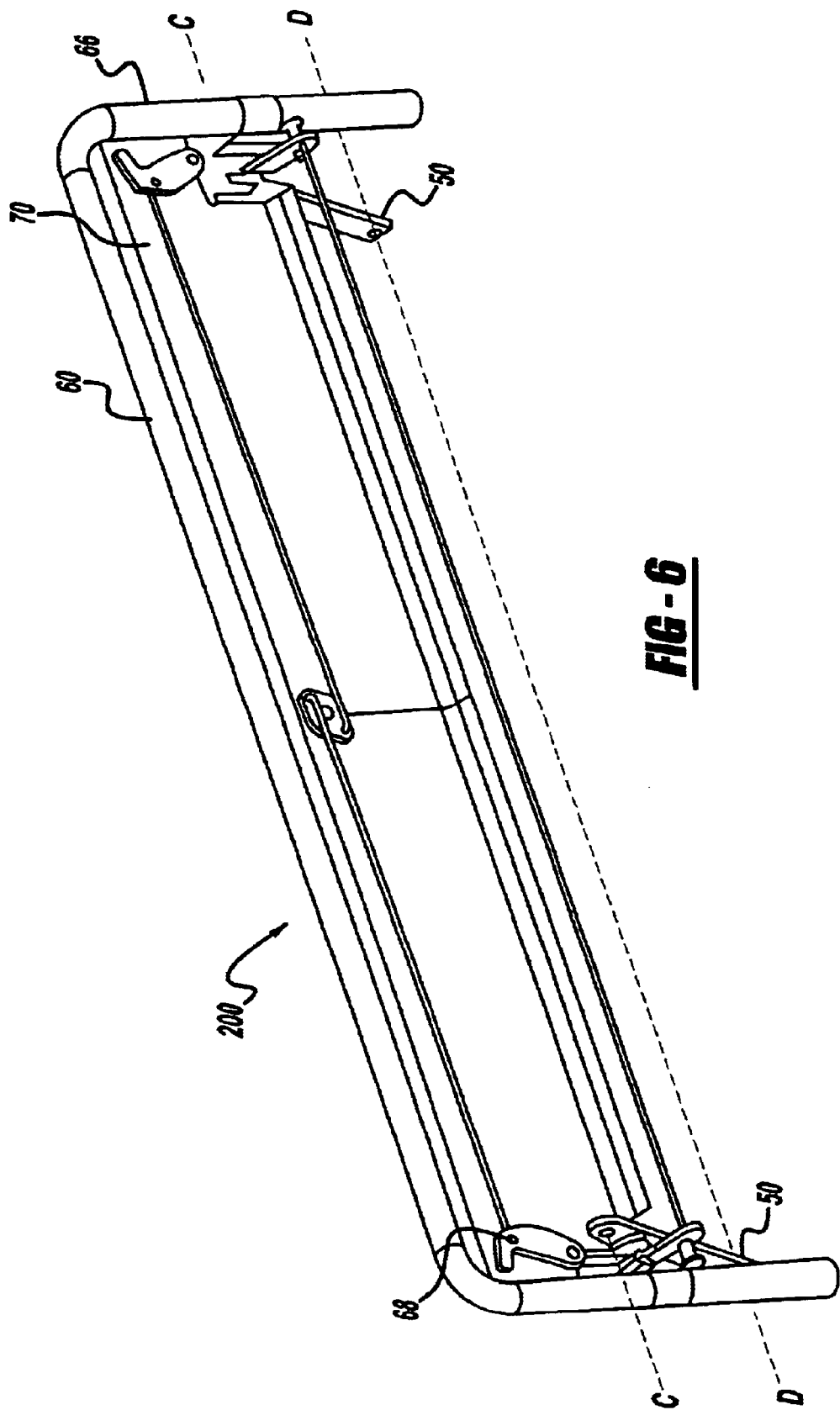
FIG. 6 illustrates an embodiment of a rear assembly of the stowable vehicle seat in the telescoped position.

FIG. 6 illustrates an embodiment of a rear assembly 200 of the stowable vehicle seat 300 in the retracted position.

A telescope locking means 68 is positioned within the lower frame 66 for coupling the upper frame 62, mid-frame 64 and lower frame 66 relative to one another. The telescope locking means may be comprised of a mechanism having a latched position for locking the upper frame 62, mid-frame 64 and lower frame 66 relative to one another when the telescoping assembly is in either of the retracted and extended positions, and a telescoping position for allowing the upper frame 62, mid-frame 64 and lower frame 66 to telescope between the retracted and extended positions.

Figure 7:
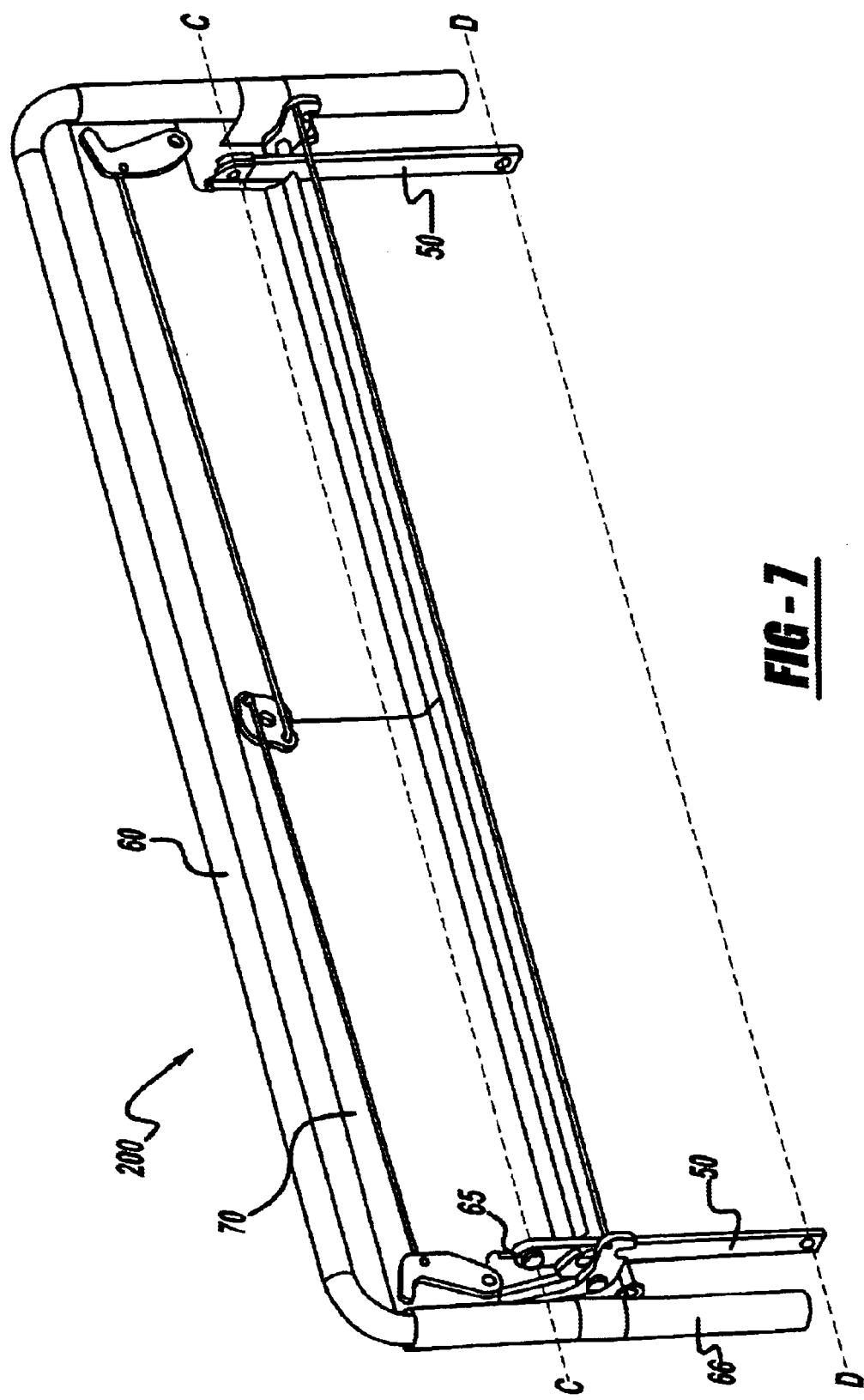
FIG. 7 illustrates an embodiment of a rear assembly of the stowable vehicle seat in the ready-to-stow position.

FIG. 7 illustrates an embodiment of a rear assembly 200 of the stowable vehicle seat 300 in the ready-to-stow position.

A rear frame pivoting means 65 couples the rear frame 60 and the rear support 50 through the rear cross piece 70 at point C. The rear frame pivoting means 65 may be comprised of a mechanism having a latched position for locking the rear frame 60 relative to the rear support 50 when it is in one of the seat-back position and the ready-to-stow position, and a pivot position for allowing the rear frame 60 to pivot between the seat-back position and the ready-to-stow position. In addition, the rear frame pivoting means 65 may include a means for sensing when the telescoping assembly is telescoped from the extended position to the retracted position and for placing the rear frame pivoting means 65 in the pivot position in response. The means for sensing when the telescoping assembly is telescoped from the extended position to the retracted position utilizes a mechanical linkage or an electrical contact.

In response to the telescoping assembly being placed in the retracted position, the rear frame 60 is allowed to pivot to the ready-to-stow position where it aligns with the rear support 50 and "locks" into place relative to the rear support 50. In this intermediate configuration, the rear support 50 and the rear frame 60 form a substantially flat angled-forward ready-to-stow configuration.

Figure 8:
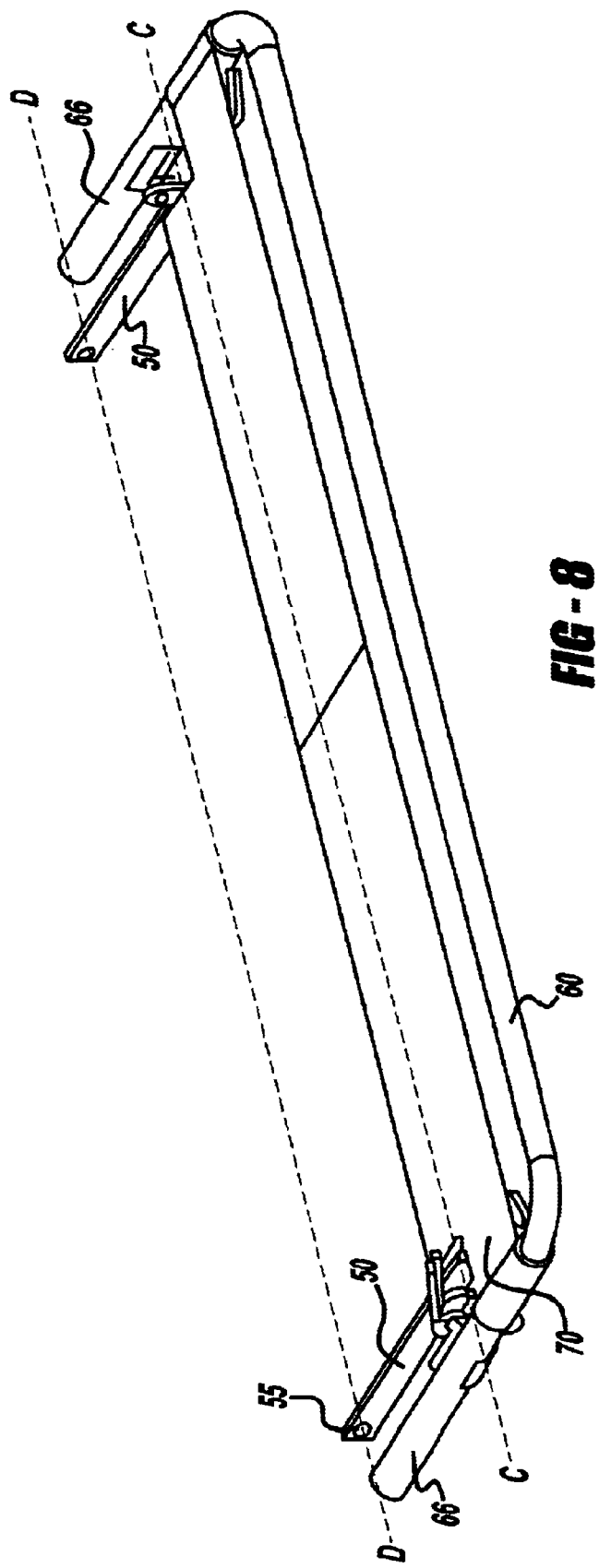
FIG. 8 illustrates an embodiment of a rear assembly of the stowable vehicle seat in the stowed position.

FIG. 8 illustrates an embodiment of a rear assembly 200 of the stowable vehicle seat 300 in the stowed position.

A rear support pivoting means 55 is coupled to the rear support 50 at point D for pivotally coupling the rear support 50 to the vehicle floor 150. The rear support pivoting means 55 may be comprised of a mechanism having a latched position for locking the rear support 50 relative to the vehicle floor 150 when the rear support 50 is in either of the support position and the stowed position, and a pivot position for allowing the rear support 50 to pivot between the support position and the stowed position. In addition, the rear support pivoting means 55 may include a means for sensing when the rear frame 60 is pivoted from the seat-back position to the ready-to-stow position and for placing the rear support pivoting means 55 in the pivot position in response. The means for sensing when the rear frame 60 is pivoted from the seat-back position to the ready-to-stow position can utilize a mechanical linkage or an electrical contact.

In response to the rear frame 60 being pivoted from the seat-back position to the ready-to stow position, the rear support 50 is allowed to pivot to the stowed position. Once in the stowed position, the rear support 50 and rear frame 60 form a substantially horizontal flat configuration. The rear assembly 200 can thus be easily stowed and fixed against the vehicle floor 150 or within a depression 160 in a vehicle floor 150 in order to prevent movement relative to the vehicle floor 150.

The telescoping assembly reduces the size of the subassembly, reducing the amount of floor space required for stowing the rear subassembly. The rear assembly 200 can thus be easily stowed and fixed against the vehicle floor 150 or within a depression 160 in a vehicle floor 150 in order to prevent movement relative to the vehicle floor 150.

Figure 9:
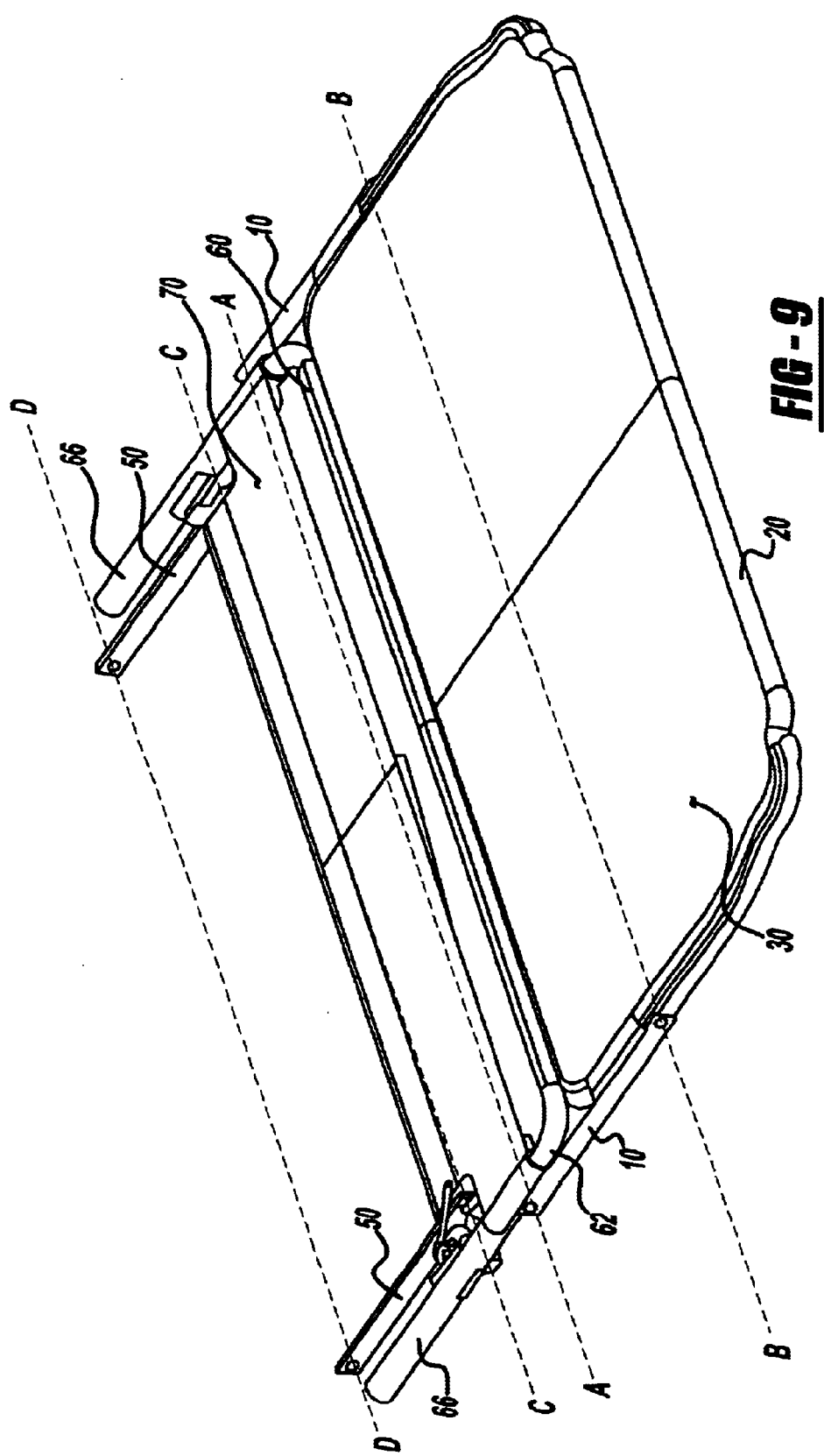
FIG. 9 illustrates an embodiment of the stowable vehicle seat with the bottom assembly in the stowed position and the rear assembly in the stowed position each adjacent the other.

FIG. 9 illustrates an embodiment of the stowable vehicle seat with the bottom assembly 100 and the rear assembly 200 shown adjacent one another in their respective stowed positions. In this embodiment, the bottom assembly 100 and rear assembly 200 form flat configurations stowed adjacent one another. In the stowed configuration of this embodiment, the upper frame 62 of the rear assembly 200 efficiently fits within the front supports 10 of the bottom assembly 100.

In a further embodiment (not shown) of the stowable vehicle seat according to the invention, the seat is pivotally mounted to a vehicle floor and stowed in a depression of the vehicle floor. According to one embodiment, the front support 10 and rear supports 50 are each pivotally coupled to a vehicle floor 150 as shown in FIG. 1. In this embodiment, the vehicle floor 150 includes a depression (not shown) for receiving the bottom assembly 100 and a depression for receiving the rear assembly 200 in the stowed configuration. In the stowed position, the bottom assembly 100 including the bottom cross piece 30, and the rear assembly 200 including the rear cross piece are capable of forming a load floor suitable for supporting cargo loaded into the vehicle.

Although the invention has been described in detail with reference to certain preferred embodiments and specific examples, variations and modification exist within the scope and spirit of the invention as described and as defined in the following claims.

What is claimed is:

1. A vehicle seat assembly, comprising:
    a seat base assembly pivotally connected to a front support, the front support being adapted to pivotally connect to a vehicle floor; and
    a seat back assembly pivotally connected to a rear support, the rear support being adapted to pivotally connect to the vehicle floor, the seat back assembly further comprising a base tubular member and a telescoping member slidably received in the base tubular member for adjusting the height of the seat back assembly, the seat base assembly being detachably connected to the base tubular member and supported by the seat back assembly.

\* \* \* \* \*